United States Patent [19]
Fujiwara et al.

[11] Patent Number: 5,342,252
[45] Date of Patent: Aug. 30, 1994

[54] TOOTHED BELT

[75] Inventors: Toru Fujiwara, Tokorozawa; Yoshinori Itoh, Hanno, both of Japan

[73] Assignee: Tsubakimoto Chain Co., Osaka, Japan

[21] Appl. No.: 132,387

[22] Filed: Oct. 6, 1993

[30] Foreign Application Priority Data

Oct. 13, 1992 [JP] Japan .......................... 4-077172[U]

[51] Int. Cl.5 ................................................ F16G 1/10
[52] U.S. Cl. ................................. 474/266; 474/268
[58] Field of Search ............................ 474/260–268; 428/375, 378, 390–394

[56] References Cited

U.S. PATENT DOCUMENTS

| | | | |
|---|---|---|---|
| 4,514,179 | 4/1985 | Skura | 474/266 X |
| 5,178,586 | 1/1993 | Mizuno et al. | 474/266 |
| 5,230,667 | 7/1993 | Nakajima et al. | 474/268 X |

*Primary Examiner*—Thuy M. Bui
*Attorney, Agent, or Firm*—Howson and Howson

[57] ABSTRACT

Resistance to tooth chipping in toothed belt in which rubber teeth are covered by a tooth cloth, is improved by providing for residual elongation of the tooth cloth so that it does not float or separate from the rubber teeth when tooth-deforming forces are applied, and by providing the tooth cloth with sufficient breaking strength so that the product of its breaking strength and its elongation are at least equal to a specified value.

1 Claim, 1 Drawing Sheet

TOOTHED BELT

DETAILED DESCRIPTION

This invention relates to toothed belts for power transmission, and more particularly to improvements in toothed belts of the kind used for driving the camshaft of an automobile engine.

A typical toothed belt consists of a loop of rubber having teeth formed on the side facing the interior of the loop, tensile force sustaining members, or "tensile bodies", embedded in the rubber, and a "tooth cloth" covering at least the toothed surface of the rubber. The tooth cloth is formed of weft and warp fibers and is solidified by an elastomer. The weft fibers extend in the longitudinal direction of the toothed belt, and the warp fibers extend in the direction of the width of the toothed belt. The fiber used for the tooth cloth are typically polyamide (nylon) fibers. In the typical toothed belt, a clothing-type polyamide fiber is used for both the weft and the warp, or an industrial material polyamide fiber is used for the weft and a clothing-type polyamide fiber is used for the warp.

In manufacture of the tooth cloth described above, the cloth is passed through dies having tooth profiles corresponding to those of a toothed pulley. The tooth cloth passing through the dies must stretch in the weft direction while conforming to the irregularities of the dies. Accordingly, the weft is usually subjected to wooly finish.

Because of the trend toward achievement of high performance in automobile engines, toothed camshaft drive belts have been required to cope with the high temperatures and increased loads. In particular, it is important to ensure high durability in the belt to avoid tooth chipping. Tooth chipping is generally considered to be related to floating and breakage of the tooth cloth.

Floating of a tooth cloth occurs as a result of excessive loads, deficient rigidity of the tooth rubber, poor adhesion of the tooth cloth, deficient residual elongation of the tooth cloth, or combinations of the above.

Accordingly, the principal object of this invention is to prevent tooth-chipping in a tooth belt by improvement of the construction of a tooth cloth.

It has been determined that, with the tooth profiles currently used in toothed pulleys and belts, the tooth cloth is stretched by about 50 to 60% when the belt is formed. As a result, the tooth cloth loses much of its ability to elongate in the weft direction. Assuming a tooth cloth wholly loses its elongation ability, when a load is applied which deforms the teeth of the belt, the tooth cloth tends to float, i.e. to separate from the rubber at the bottoms of teeth. This allows breakage of the tooth cloth and tooth chipping to occur.

The toothed belt in accordance with the invention prevents tooth chipping by utilizing a tooth cloth having a high elongation and a high product of elongation and breaking strength. More specifically, the toothed belt of the invention comprises an elongated element of rubber disposed in a loop and having embedded tensile reinforcing bodies and a tooth cloth covering at least a single surface of said rubber element, wherein the tooth cloth has a weft extending in the direction of elongation of the rubber element and a warp extending in the direction of the width of the rubber element, and wherein the weft has a wooly finish and, before the tooth cloth is affixed to the rubber element, its weft exhibits an elongation percentage of at least 70% under stretching in the weft direction when subjected to a force of 1 kgf/cm, and the product of the elongation percentage (%) and the breaking strength (kgf/3 cm) of the weft is at least 16,000.

With an elongation of the tooth cloth of 70% or more in the weft direction, before being affixed to the rubber element, a residual elongation of at least 10% is allowed after the tooth cloth is affixed to the rubber element, preferably by adhesive bonding. This makes it possible for the tooth cloth to stretch as the rubber teeth deform under load, and prevents floating of the tooth cloth due to insufficient residual elongation of the tooth cloth. It also prevents the tensile strength of the tooth cloth from being reduced in the weft direction when floating occurs.

Floating of the tooth cloth can be prevented by allowing its elongation when a small force is applied to it. Accordingly, the elongation value is that obtained when the tooth cloth is stretched by the application of a force of 1 kgf/cm; not the elongation value obtained by breaking the tooth cloth.

Tooth-chipping is also dependent on the breaking tensile strength of the weft, and accordingly, the breaking tensile strength of the weft (expressed in terms of the product of the percentage of elongation and the breaking strength in kgf/3 cm) is high. By leaving sufficient residual elongation ability in the tooth cloth and by making the breaking tensile strength of the tooth cloth sufficiently large, excellent durability can be achieved in a toothed belt. Thus, according to the invention, the product of the elongation percentage (%) and the breaking strength (kgf/3 cm) of the weft is preferably at least 16,000.

Further objects, details and advantages of the invention will be apparent from the following detailed description, when read in conjunction with the drawings.

DETAILED DESCRIPTION

Figure 2:
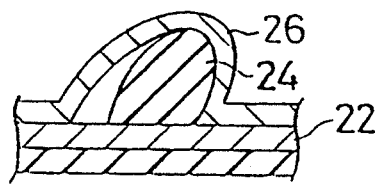
FIG. 2 is a fragmentary sectional view illustrating the phenomenon of floating of the tooth cloth in a prior art toothed belt.

Referring first to FIG. 2, the belt is shown with a tensile body 22 embedded in rubber, a rubber tooth 24 and a tooth cloth 26. The tooth 24 is deformed by a load, and the tooth cloth is shown in a floating condition, being separated from one side of the tooth 24. As mentioned above, floating of the tooth cloth is considered to be a result of excessive load, deficient rigidity of the rubber of the tooth, poor adhesion of the tooth cloth, deficient residual elongation of the tooth cloth, and combinations thereof.

Figure 3:
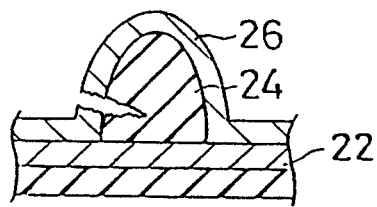
FIG. 3 is a fragmentary sectional view illustrating the phenomenon of breakage of a filament of a tooth cloth in a prior art toothed belt.

Breakage of the tooth cloth, as shown in FIG. 3, is considered to result from excessive concentration of load, and/or deficient strength in one or more of the filament of the tooth cloth 26. As shown, breaking of filaments of the tooth cloth allows chipping of the teeth, and ultimate failure of the belt, to occur.

Figure 1:
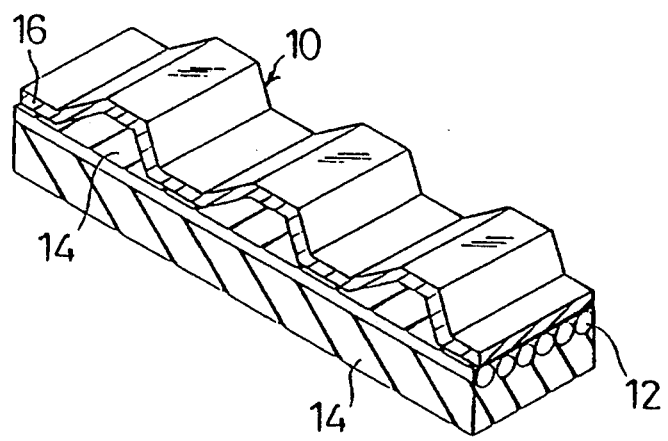
FIG. 1 is a fragmentary perspective view of a toothed belt in accordance with the invention shown in section to illustrate the embedded reinforcing elements and the relationship between the rubber teeth and the tooth cloth.

As shown in FIG. 1, a typical toothed belt 10 in accordance with the invention comprises a toothed rubber element 14 having embedded tensile reinforcing bodies 12, and a tooth cloth 16 covering a single surface of the rubber element 14. Although it is possible for the belt to have a tooth cloth only on one side as shown, in an alternative version, not illustrated, teeth may be formed on both sides of the rubber element, and both sets of teeth are covered by tooth cloths. The material and construction of the tooth cloth 16, improve the durability of the belt against shock and friction.

The weft and the warp of the tooth cloth are composed of a polyamide (nylon 66), and have the following features:

1. sulfuric acid relative viscosity: 3 or more
2. size (d) of single fiber: 5 to 10
3. strength (g/d) of single fiber: 8 to 12

In a preferred embodiment, the weft and the warp have the following features:

Weft
1. sulfuric acid relative viscosity: 3 or more
2. size (d) of single fiber: 6
3. strength (g/d) of single fiber: 9.5
4. base fiber denier×number: 210×3
5. density (number/5 cm): 116 to 127

Warp
1. sulfuric acid relative viscosity: 3 or more
2. size (d) of single fiber: 6
3. strength (g/d) of single fiber: 9.5
4. base fiber denier×number: 210×2
5. density (number/5 cm): 105 to 122

The tooth cloth, formed of the above weft and warp, is impregnated with a rubber cement containing isocyanate, RFL (a solution of an RF resin obtained by reaction of resorcinol and formalin mixed with a latex), or the like. In the above, after impregnation of RFL, an overcoat of rubber cement may be applied.

The tooth cloth before being formed has the following characteristics:

1. elongation (%) in weft direction under stretching with 1 kgf/cm: 70 or more
2. product of elongation (%) in weft direction under stretching with 1 kgf/cm and tensile strength (kgf/3 cm) in weft direction: 16,000 or more
3. total denier ratio between warp and weft: 1:1.4 or more The toothed belt is formed by the steps of: winding a tooth cloth having the above characteristics around a die having a belt tooth profile; winding tensile reinforcing bodies around the tooth cloth on the die; winding an unvulcanized rubber sheet for forming a tooth rubber and a back rubber; forming and vulcanizing the rubber sheet under pressure to produce the formed belt comprising the rubber, the tensile reinforcing bodies and the tooth cloth; and cutting the formed belt to a specified width, to produce the annular toothed belt.

Each tensile body is formed of a core wire of twisted glass fibers, aramid fibers, metal fibers or the like, impregnated with RFL as needed, on the surface of which a rubber cement or the like is overcoated. As the tooth rubber and the back rubber, there may be used a rubber selected from one kind or mixture of CR, NBR, HSN, BR, EPDM, EPR, CSM, epichlorohydrin, urethane, and the like.

In the toothed belt in accordance with the invention, the various parameters of the tooth cloth have the following significance:

When the sulfuric acid relative viscosity is less than 3, the degree of polymerization of the polyamide is lowered. This shortens the service life by making the rubber more susceptible to the tooth-chipping.

The size of the single fibers exerts an effect on a relationship between the strength, elongation and stress the filaments. Namely, when the fiber size is smaller, cutting of the filament tends to occur. This leads to breakage of the tooth cloth. On the other hand, when the fiber size is larger, the stress required to achieve a given degree of elongation is significantly increased, and consequently the tooth cloth tends not to elongate adequately in response to deformation of the teeth.

When the strength of a single fiber is less than 8 g/d, breakage of the tooth cloth tends to occur when of an impact shearing force is applied to the toothed belt. On the other hand, when the strength of the single fiber is more than 12 g/d, its rigidity against bending is higher, so that the stress required to achieve a given degree of elongation of the tooth cloth is increased. This impairs the ability of the cloth to elongate when subjected to stretching with a force of 1 kgf/cm.

The product of the denier of the base fibers and the number thereof, and the density are determined, giving consideration to the P.L.D. (Pitch Line Differential) of the toothed belt currently used.

The reason why the elongation of the non-formed tooth cloth, when stretched by a force of 1 kgf/cm, is 70% or more, is so that, after the toothed cloth is adhesively-bonded to the rubber of the toothed belt after being formed, a residual elongation capability of at least 10% is ensured. This is based on the fact that, in the formation of a belt having a tooth profile conforming to the tooth shape currently used in toothed pulleys, the tooth cloth loses 50 to 60% of its elongation. Initial elongation of the tooth cloth requires only a very small force, and the full elongation of 70% or more requires a force not exceeding about 1 kgf/cm.

The tooth cloth, which ensures the required residual elongation ability, can be stretched along the tooth rubber when the teeth are deformed. This makes it possible to prevent floating of the tooth cloth, i.e. separation of the tooth cloth from the tooth rubber. In addition, when the teeth are deformed, increase in the stress of the tooth cloth is suppressed, and the tooth cloth is prevented from immediately reaching the upper limit of its tensile strength when the teeth are deformed.

The reason why the product of the elongation percentage (%) in the weft direction under stretching with 1 kgf/cm, and the breaking strength (kgf/3 cm) in the weft direction, is 16,000 or more, is based on the fact that tooth-chipping is also greatly affected by the breaking tensile strength of the weft. The ability of the tooth cloth to elongate is, by itself, insufficient. The tooth cloth must also have some strength after its elongation exceeds about 70%. Tooth chipping is prevented by the combination of elongation ability and strength of the tooth cloth. Accordingly, the important parameter is the product of elongation and breaking tensile strength.

The total denier ratio between the warp and the weft is preferably 1:1.4 or more, to suppress the amount of the warp at minimum in viewpoint of the bending rigidity and abrasion of the toothed belt.

Experiments were made to measure the service life of the toothed belt of the invention, taking tooth chipping into account. The test conditions were as follows:
belt width: 15 mm
number of belt teeth: 124 (pitch: 8 mm)

initial belt tension: 12 kgf
transmitted load: 100 kgf
rotational speed: 3000 r.p.m.
test temperature: 30° to 40° C.
The results are shown in Table 1 below.

| | | Working example | | | Comparative example | | Conventional |
|---|---|---|---|---|---|---|---|
| | Item | 1 | 2 | 3 | 1 | 2 | example |
| weft | material of fiber | polyamide | polyamide | polyamide | polyamide | polyamide | polyamide |
| | sulfuric acid relative viscosity | 3.0 | 3.0 | 3.0 | 3.0 | 3.0 | 2.9 |
| | size (d) of single fiber | 6 | 6 | 6 | 6 | 6 | 6 |
| | strength (g/d) of single fiber | 9.5 | 9.5 | 9.5 | 9.5 | 9.5 | 8.3 |
| | base fiber denier × number | 210 × 3 | 210 × 3 | 210 × 3 | 210 × 3 | 210 × 2 | 210 × 3 |
| | density (number/5 cm) | 116 | 116 | 127 | 120 | 125 | 120 |
| warp | material of fiber | polyamide | polyamide | polyamide | polyamide | polyamide | polyamide |
| | sulfuric acid relative viscosity | 3.0 | 3.0 | 3.0 | 3.0 | 3.0 | 2.9 |
| | size (d) of single fiber | 6 | 6 | 6 | 6 | 6 | 6 |
| | strength (g/d) of single fiber | 9.5 | 9.5 | 9.5 | 9.5 | 9.5 | 8.3 |
| | base fiber denier × number | 210 × 2 | 210 × 2 | 210 × 2 | 210 × 2 | 210 × 3 | 210 × 2 |
| | density (number/5 cm) | 122 | 119 | 105 | 117 | 114 | 118 |
| | elongation (%) in weft direction with 1 kgf/cm | 80 | 70 | 80 | 62 | 80 | 60 |
| | tensile strength (kgf/3 cm) in weft direction | 230 | 230 | 252 | 235 | 180 | 180 |
| | (elongation in weft direction with 1 kgf/cm) × (tensile strength in weft direction) | 18400 | 16100 | 20160 | 14570 | 14400 | 10800 |
| | total denier ratio between warp and weft | 1.43 | 1.46 | 1.81 | 1.54 | 0.73 | 1.53 |
| | life (h) in tooth-chipping of belt | 291 | 266 | 308 | 159 | 173 | 105 |

Comparative examples 1 and 2, which do not conform to the present invention, were prepared to confirm the effect of the toothed belt according to the invention. Comparative examples 1 and 2 show good results as compared with conventional example. However, they are inferior to the toothed belt in accordance with the invention.

First, compared with conventional example, the toothed belt of comparative example 1 has improved strength. It has a sulfuric acid relative viscosity of 3.0, a single fiber strength of 9.5 g/d, and a tensile strength, in the weft, direction of 235 kgf/3 cm. Thus it has a prolonged service life in comparison with that of the conventional example.

On the other hand, compared with the conventional example, the toothed belt of comparative example 2 has the same tensile strength in the weft direction but improved elongation in the weft direction, i.e. 80% under an applied force of 1 kgf/cm by 80%. In comparative example 2, the service life of the toothed belt is greater than that of the conventional example, and also somewhat greater than that of comparative example 1.

In working example 1, in accordance with the present invention, the strength of the tooth cloth is enhanced, the elongation of the toothed cloth is enlarged, and the strength of the single fibers is enhanced. As shown by the working examples, by combining respective characteristics with one other, it is possible to reduce tooth chipping significantly and thereby achieve significant improvements in the service life of the toothed belt. It is apparent from Table 1 that it is important to ensure that the product of elongation percentage (%) in the weft direction under stretching with 1 kgf/cm force, and the breaking strength (kgf/3 cm) in the weft direction, is 16,000 or more. This makes it possible to enhance the service life of the toothed belt significantly.

According to the present invention, by providing for elongation of at least 70% in the non-formed tooth cloth in the weft direction under a stretching force of 1 kgf/cm, and by ensuring a residual elongation of at least 10% in the tooth cloth, after the toothed belt is formed, it is possible to prevent floating of the tooth cloth away from the tooth rubber due to the deficient residual elongation of the tooth cloth, and to reduce the tensile stress of the tooth cloth in the weft direction.

Since tooth-chipping is greatly affected by the strength of the weft of the tooth cloth, in the invention, the product of elongation percentage (%) and breaking strength (kgf/3 cm) of the weft is 16,000 or more. By ensuring the elongation, and by improving the breaking tensile strength of the tooth cloth, it is possible to enhance the durability of the toothed belt, to reduce tooth chipping, and to improve the service life of the tooth belt.

We claim:

1. A toothed belt comprising an elongated element of rubber disposed in a loop and having embedded tensile reinforcing bodies and a tooth cloth covering at least a single surface of said rubber element, wherein the tooth cloth has a weft extending in the direction of elongation of the rubber element and a warp extending in the direction of the width of the rubber element, and wherein the weft has a wooly finish and, before the tooth cloth is affixed to the rubber element, its weft exhibits an elongation percentage of at least 70% under stretching in the weft direction when subjected to a force of 1 kgf/cm, and the product of the elongation percentage (%) and the breaking strength (kgf/3 cm) of the weft is at least 16,000.

* * * * *